(12) United States Patent
Miura et al.

(10) Patent No.: US 7,104,585 B2
(45) Date of Patent: Sep. 12, 2006

(54) FORWARD DISPOSED PART INSTALLATION STRUCTURE OF MOTORCYCLE

(75) Inventors: Ryoichi Miura, Saitama (JP);
Hirotoshi Akita, Saitama (JP);
Kazumichi Hamaguchi, Saitama (JP)

(73) Assignee: Honda Access Corporation, Saitama (JP)

( * ) Notice: Subject to any disclaimer, the term of this patent is extended or adjusted under 35 U.S.C. 154(b) by 0 days.

(21) Appl. No.: 10/471,710

(22) PCT Filed: Feb. 21, 2002

(86) PCT No.: PCT/JP02/01568

§ 371 (c)(1),
(2), (4) Date: Mar. 8, 2004

(87) PCT Pub. No.: WO02/074614

PCT Pub. Date: Sep. 26, 2002

(65) Prior Publication Data

US 2004/0134703 A1    Jul. 15, 2004

(30) Foreign Application Priority Data

Mar. 15, 2001   (JP) ............................ 2001-073423
Mar. 15, 2001   (JP) ............................ 2001-073424

(51) Int. Cl.
*B62J 17/04* (2006.01)
*B62J 7/00* (2006.01)
(52) U.S. Cl. .................................................. 296/78.1
(58) Field of Classification Search ............... 296/78.1
See application file for complete search history.

(56) References Cited

U.S. PATENT DOCUMENTS

| | | | | |
|---|---|---|---|---|
| 3,922,031 A | * | 11/1975 | Hugon | 296/78.1 |
| 4,379,584 A | * | 4/1983 | Willey | 296/78.1 |
| 5,732,965 A | * | 3/1998 | Willey | 280/288.4 |
| 5,788,313 A | * | 8/1998 | Willey | 296/78.1 |
| 5,988,727 A | * | 11/1999 | Mueller | 296/78.1 |
| 6,042,171 A | * | 3/2000 | Hesse | 296/78.1 |
| 6,196,614 B1 | * | 3/2001 | Willey | 296/78.1 |
| 6,254,166 B1 | * | 7/2001 | Willey | 296/78.1 |

FOREIGN PATENT DOCUMENTS

| | | |
|---|---|---|
| GB | 1029246 | 5/1966 |
| JP | 52-96989 | 8/1980 |
| JP | 55-120809 | 9/1980 |
| JP | 58-87678 | 6/1983 |
| JP | 58-149408 | 9/1983 |

(Continued)

*Primary Examiner*—Dennis H. Pedder
(74) *Attorney, Agent, or Firm*—Carrier, Blackman & Associates, P.C.; William D. Blackman; Joseph P. Carrier

(57) ABSTRACT

In a two-wheeled motor vehicle in which a front fork including a pair of telescopic fork legs disposed on opposite sides of a front wheel, and a top bridge and a bottom bridge which connect upper cases of the fork legs to each other at two points vertically spaced apart from each other, is steerably supported by a head pipe at a front end of a vehicle body frame assembly, and a steering handlebar is connected to an upper end of the front fork, part-mounting fixtures (45L, 45R) for supporting a front part (37) disposed in front of the steering handlebar (22) are detachably mounted on the upper cases (32) of the front fork (21). Thus, the front part can be mounted easily with an increase in degree of freedom of the disposition thereof.

15 Claims, 13 Drawing Sheets

FOREIGN PATENT DOCUMENTS

| | | |
|---|---|---|
| JP | 59-111785 | 7/1984 |
| JP | 63-25687 | 2/1988 |
| JP | 130336 | 12/1991 |
| JP | 9-103307 | 4/1997 |
| JP | 9-240541 | 9/1997 |
| JP | 11-51014 | 2/1999 |

\* cited by examiner

FORWARD DISPOSED PART INSTALLATION STRUCTURE OF MOTORCYCLE

FIELD OF THE INVENTION

The present invention relates to a two-wheeled motor vehicle comprising a front fork including a pair of telescopic fork legs disposed on opposite sides of a front wheel, and a top bridge and a bottom bridge which connect upper cases of the fork legs to each other at two points vertically spaced apart from each other, the front fork being steerably supported by a head pipe at a front end of a vehicle body frame assembly, and a steering handlebar connected to an upper end of the front fork, and particularly, to an improvement in a mounting structure for mounting of a front part disposed in front of the steering handlebar, such as a luggage-accommodating cage, a windscreen and a mini-cowl.

BACKGROUND ART

It is conventionally common that a front part such as a windscreen is mounted to a steering handlebar.

However, a space must be ensured in the steering handlebar for disposition of a brake-operating lever and a clutch-operating lever, a master cylinder for outputting a braking liquid pressure in response to the operation of the brake-operating lever, and meters and hence, the position for mounting the front part such as the windscreen is limited, resulting in a decrease in degree of freedom of the disposition.

DISCLOSURE OF THE INVENTION

The present invention has been accomplished with such circumstances in view, and it is an object of the present invention to provide a structure of mounting of a front part in a two-wheeled motor vehicle, wherein a front part can be mounted easily with an increase in degree of freedom of the disposition thereof.

To achieve the above object, according to a first aspect and feature of the present invention, there is provided a structure of mounting of a front part in a two-wheeled motor vehicle comprising a front fork including a pair of fork legs each of which is formed telescopically to have a cylindrical lower case for pivotally supporting a front wheel at a lower end thereof and a cylindrical upper case fitted into the lower case, the fork legs being disposed on opposite sides of the front wheel, a top bridge for connecting upper portions of the pair of upper cases to each other, and a bottom bridge for connecting the upper cases to each other below the top bridge, the front fork being steerably supported by a head pipe at a front end of a vehicle body frame assembly; and a steering handlebar connected to an upper end of the front fork, characterized in that part-mounting fixtures for supporting the front part disposed in front of the steering handlebar are detachably mounted to the upper cases of the front fork.

With such arrangement of the first feature, the front part disposed in front of the steering handlebar is detachably mounted to the upper cases included in the front fork. Therefore, the front part can be mounted easily with an increase in degree of freedom of the disposition limited in the steering handlebar.

According to a second aspect and feature of the present invention, in addition to the first feature, the front part is provided with an upper mounting portion and a lower mounting portion disposed below the upper mounting portion, and the pair of upper and lower part-mounting fixtures are formed switchably between a state in which the part-mounting fixtures embrace the upper case, and a state in which the embraced state is released, and support the upper mounting portion and the lower mounting portion individually, the part-mounting fixtures being mounted to the upper case in such a manner that one of the part-mounting fixtures abuts against the top bridge from below and the other part-mounting fixture abuts against the bottom bridge from above.

With such arrangement of the second feature, when the pair of upper and lower part-mounting fixtures connected to each other through the front part are mounted to the upper case to embrace the upper case from the periphery of the latter, each of the part-mounting fixtures is inhibited from being moved vertically along the upper case. Therefore, the front part can be mounted easily to the upper case, while being positioned.

According to a third aspect and feature of the present invention, in addition to the arrangement of the first or second feature, each of the part-mounting fixtures includes a first embracing member which is formed into such a shape that the first embracing member abuts against a portion of an outer periphery of the upper case and has an engaged portion provided at one end in a circumferential direction of the upper case, an operating lever connected at a base end thereof to the other end of the first embracing member for turning movement about an axis parallel to an axis of the upper case, an intermediate lever connected at one end to an intermediate portion of the operating lever for turning movement about an axis parallel to the turning axis for the operating lever, and a second embracing member which is connected at one end to the other end of the intermediate lever for turning movement about an axis parallel to the turning axis for the operating lever and is provided at the other end with an engaging portion disengageably engaging with the engaged portion of the first embracing member, and the first embracing member is provided with a lever-retaining member which is resiliently engaged with the operating lever to retain the turned position of the operating lever, when the operating lever has been turned to a position in which the second embracing member having the engaging portion engaging with the engaged portion embraces the upper case by cooperation with the first embracing member, and a mounting boss for mounting the front part.

With such arrangement of the third feature, when the engaging portion of the second embracing member engages with the engaged portion of the first embracing member and the operating lever is turned toward the first embracing member in a state in which the first embracing member, the operating lever, the intermediate lever and the second embracing member have been disposed to surround the upper case, the second embracing member is turned about a point of engagement of the engaging portion with the engaged portion in such a manner that one end of the second embracing member comes close to the first embracing member, and as a result, the upper case is embraced by the first and second embracing members. This embraced state is maintained by resiliently bringing the lever-retaining member into engagement with the operating lever. Moreover, the front part is mounted to the upper case through the part-mounting fixtures by detachably mounting the front part to the mounting boss provided on the first embracing member. To release the state of the part-mounting fixtures mounted to the upper case, the operating lever may be turned in a direction to release the resiliently engaged state of the lever-retaining member. This causes the state of the upper case embraced by the first and second embracing members to be loosened and hence, the part-mounting fixtures can be demounted from the upper case by releasing the state of the engaging portion engaging with the engaged portion. Thus, the mounting and demounting of the part-mounting fixtures to and from the upper case can be carried out easily by the turning of the operating lever.

According to a fourth aspect and feature of the present invention, in addition to the arrangement of the third feature, the intermediate lever is integrally provided with a longitudinal rod extending in parallel to the axis of the upper case and turnably connected to one end of the second embracing member, a pair of transverse rods connected perpendicularly at one ends to opposite ends of the longitudinal rod, and connecting portions provided at the other ends of the transverse rods respectively and turnably connected to an intermediate portion of the operating lever, and the operating lever is provided with a pair of accommodation grooves in which at least portions of the transverse rods on the side of the operating lever are accommodated upon turning of the operating lever in a direction of engagement with the lever-retaining member. With such arrangement, a portion of the intermediate lever is accommodated in the operating lever in a state in which the part-mounting fixtures have been mounted to the upper case. Therefore, it can be ensured that the part-mounting fixtures which have been mounted to the upper case are compact.

According to a fifth aspect and feature of the present invention, in addition to the fourth feature, the second embracing member is provided at one end with a connecting tube which surrounds the longitudinal rod to connect the longitudinal rod for turning movement, and the connecting tube has a notch provided in an axially one end thereof, so that one of the transverse rods is fitted into the notch, as the second embracing member disengaged from one end of the first embracing member and turned about an axis of the longitudinal rod to a predetermined position is slid by a predetermined amount along the longitudinal rod. With such arrangement, in the part-mounting fixtures which have been demounted from the upper case, the relative attitudes of the intermediate lever and the second embracing member can be maintained constant. Thus, the mounting operation cannot be impeded due to the drifting of the second embracing member during mounting of part-mounting fixtures to the upper case and hence, the smooth mounting operation can be conducted.

According to a sixth aspect and feature of the present invention, in addition to the fourth or fifth feature, the transverse rods and the accommodation grooves are formed so that a portion of each of the transverse rods corresponding to each of the accommodation grooves is in frictional contact with a side face of each of the accommodation grooves. With such arrangement, a frictional force opposing an operating force during turning of the operating lever is generated between each of transverse rods of the intermediate lever and the operating lever and hence, a good operational feeling can be provided during turning of the operating lever.

According to a seventh aspect and feature of the present invention, in addition to the arrangement of any of the third to sixth features, the lever-retaining member is mounted on the first embracing member so as to be resiliently engaged with the operating lever in a position displaced in one of upward and downward directions from the central position of the operating lever in a direction along the axis of the upper case. With such arrangement, even if the width of the operating lever in the direction along the axis of the upper case is not increased, a space sufficient for putting a finger on the operating lever for the turning of the latter can be ensured, which can further contribute to the compactness of the part-mounting fixtures.

BRIEF DESCRIPTION OF THE DRAWINGS

FIGS. 1 to 12 show a first embodiment of the present invention, wherein

FIG. 1 is a side view of a two-wheeled motor vehicle;

FIG. 2 is an enlarged view taken in the direction of an arrow 2 in FIG. 1;

FIG. 3 is a view taken in the direction of an arrow 3 in FIG. 2;

FIG. 4 is a perspective view showing a structure of mounting of a windscreen to an upper portion of front fork in an exploded state;

FIG. 5 is an enlarged sectional view taken along a line 5—5 in FIG. 3;

FIG. 6 is a view taken in the direction of an arrow 6 in FIG. 5;

FIG. 7 is a sectional view taken along a line 7—7 in FIG. 5;

FIG. 8 is a sectional view taken along a line 8—8 in FIG. 6;

FIG. 9 is a sectional view similar to FIG. 5, but showing a part-mounting fixture in an unclamping state;

FIG. 10 is a view taken in the direction of an arrow 10 in FIG. 9;

FIG. 11 is a sectional view taken along a line 11—11 in FIG. 6; and FIG. 12 is an enlarged sectional view taken along a line 12—12 in FIG. 3.

BEST MODE FOR CARRYING OUT THE INVENTION

Figure 1:
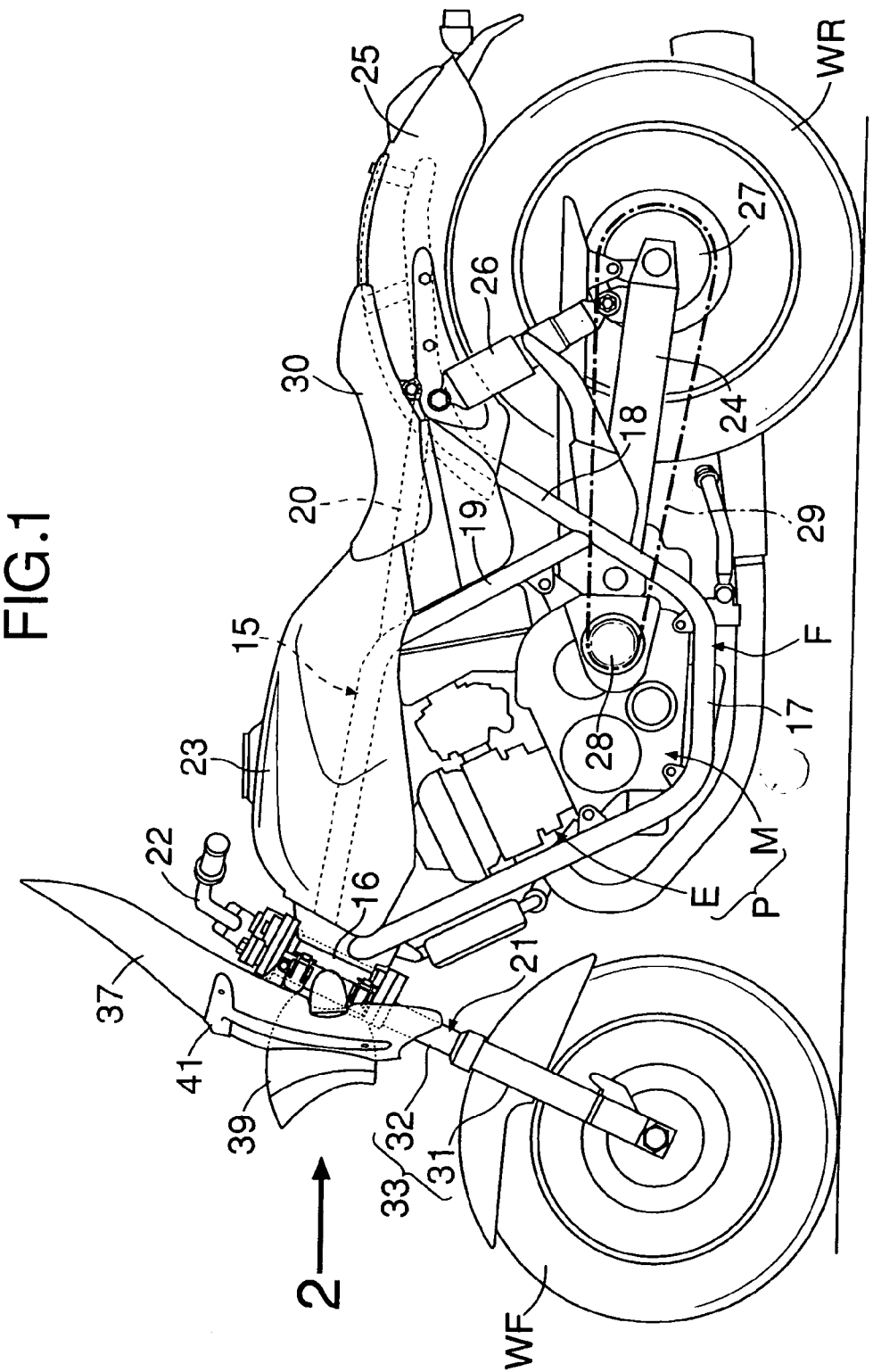

A first embodiment of the present invention will now be described with reference to FIGS. 1 to 12. Referring first to FIG. 1, a vehicle body frame assembly F in a two-wheeled motor vehicle includes a pair of left and right main frames 15 extending longitudinally in a slightly rearward declined manner, a head pipe 16 mounted at front ends of the main frames 15, a pair of left and right down-frames 17 extending from the head pipe 16 in a rearward declined manner, a pair of left and right rear frames 18 integrally connected to rear ends of the down-frames 17 and extending rearwards in an upward and inclined manner, a pair of left and right center frames 19 which are integrally connected to rear ends of the main frames 15, extend downwards and are connected to intermediate portions of the rear frames 18, and a seat stay 20 extending rearwards from the rear ends of the main frames 15 and connected to intermediate portions of the rear frames 18 at the rear of the connections of the center frames 19.

A front fork 21 is steerably supported on the head pipe 16, and a front wheel WF is pivotally supported at a lower end of the front fork 21. A steering handlebar 22 is connected to an upper end of the front fork 21.

A fuel tank 23 is mounted on the main frames 15, and a rear portion of the fuel tank 23 is disposed to cover a front portion of the seat stay 20. A power unit P comprising an engine E and a transmission M is mounted on the vehicle body frame assembly F below the fuel tank 23 and disposed in a region surrounded by the main frames 15, the downframes 17 and the center frames 19.

A swing arm 24 is vertically swingably supported at its front end on the transmission M, and a rear wheel WR is pivotally supported at a rear end of the swing arm 24. A rear fender 25 is mounted on the rear frames 18 to cover the rear wheel WR from above, and a rear cushion unit 26 is mounted between the rear fender 25 and a rear portion of the swing arm 24.

An endless chain 29 is wound around a driven sprocket 27 coaxially mounted on the rear wheel WR and a driving sprocket 28 mounted on an output shaft of the transmission M, so that the rear wheel WR is driven in rotation by a power exhibited by the power unit P.

A seat 30 for a rider is disposed at the rear of the fuel tank 23 to cover a front portion of the rear fender 25 and detachably fixed to the vehicle body frame assembly F.

Figure 2:
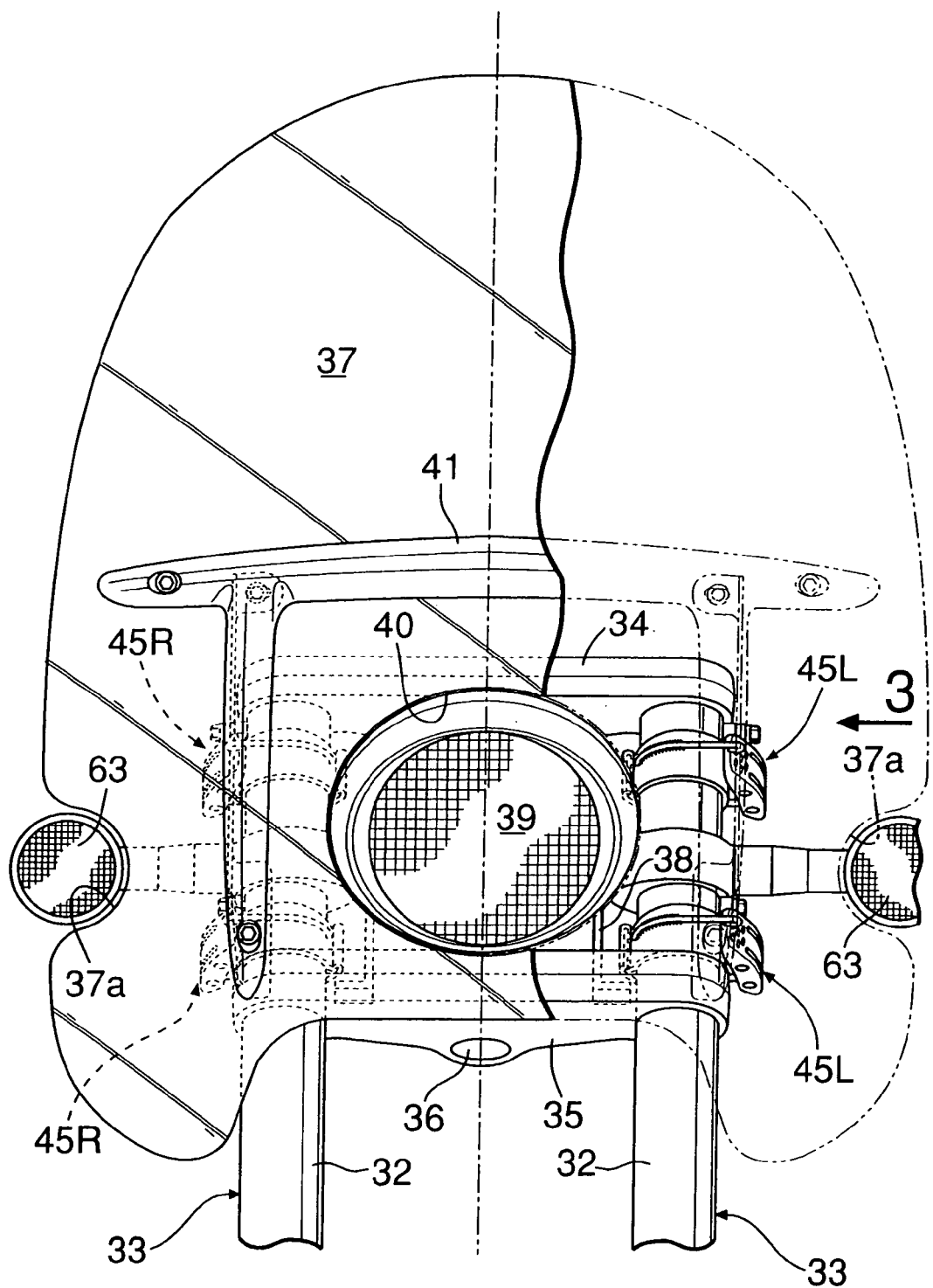
Figure 3:
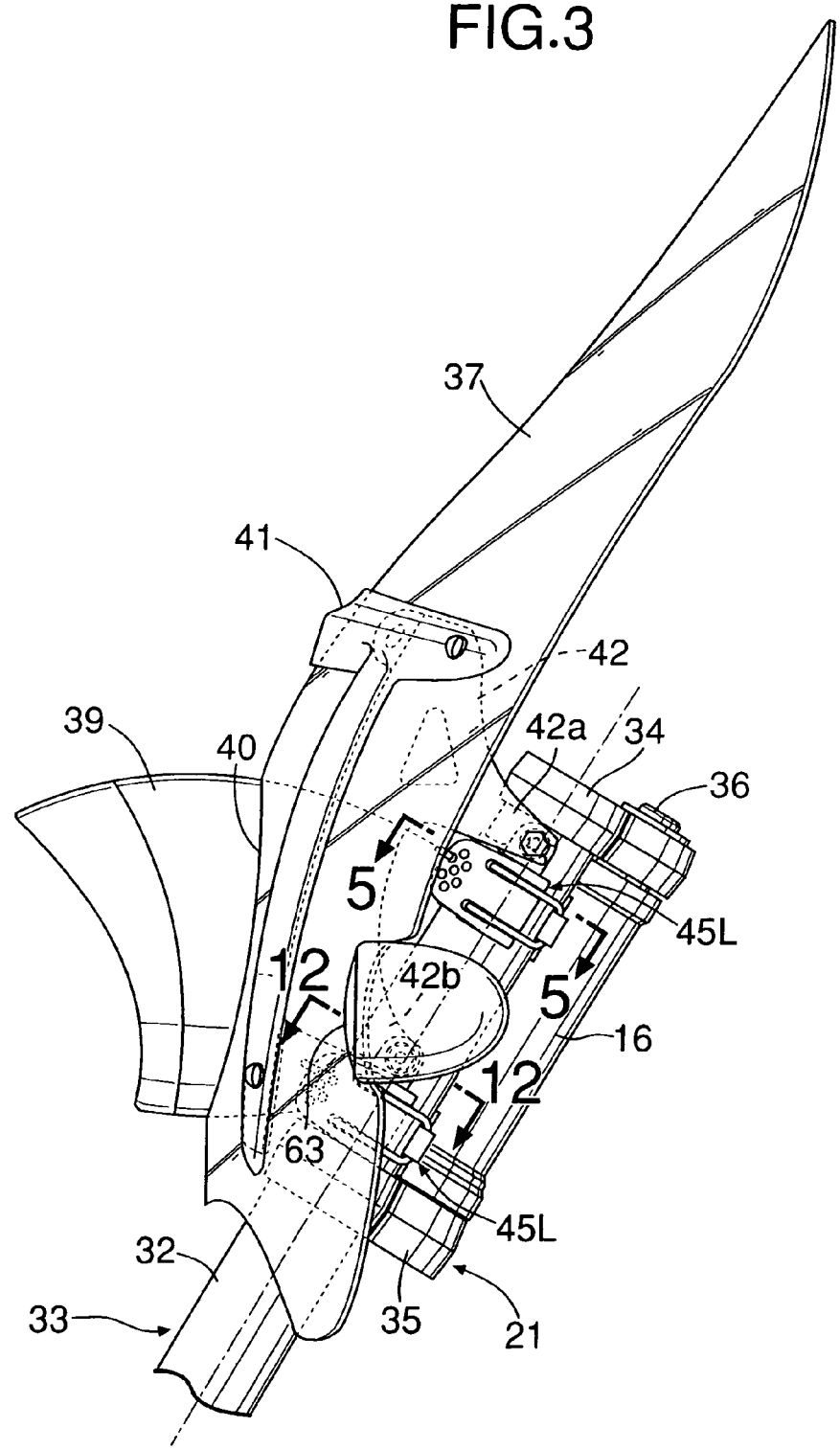

Referring also to FIGS. 2 and 3, the front fork 21 includes a pair of fork legs 33, 33 which are formed telescopically and each having a cylindrical lower case 31 for pivotally supporting the front wheel WF at its rear end and a cylindrical upper case 32 fitted into the lower case 31, and are disposed on opposite side of the front wheels WF, a top bridge 34 which connects upper portions of the pair of upper cases 32, 32 to each other, and a bottom bridge 35 which connects the upper cases 32, 32 to each other below the top bridge 34. A steering shaft 36 mounted between the top bridge 34 and the bottom bridge 35 is turnably supported by the head pipe 16 of the vehicle body frame assembly F.

Figure 4:
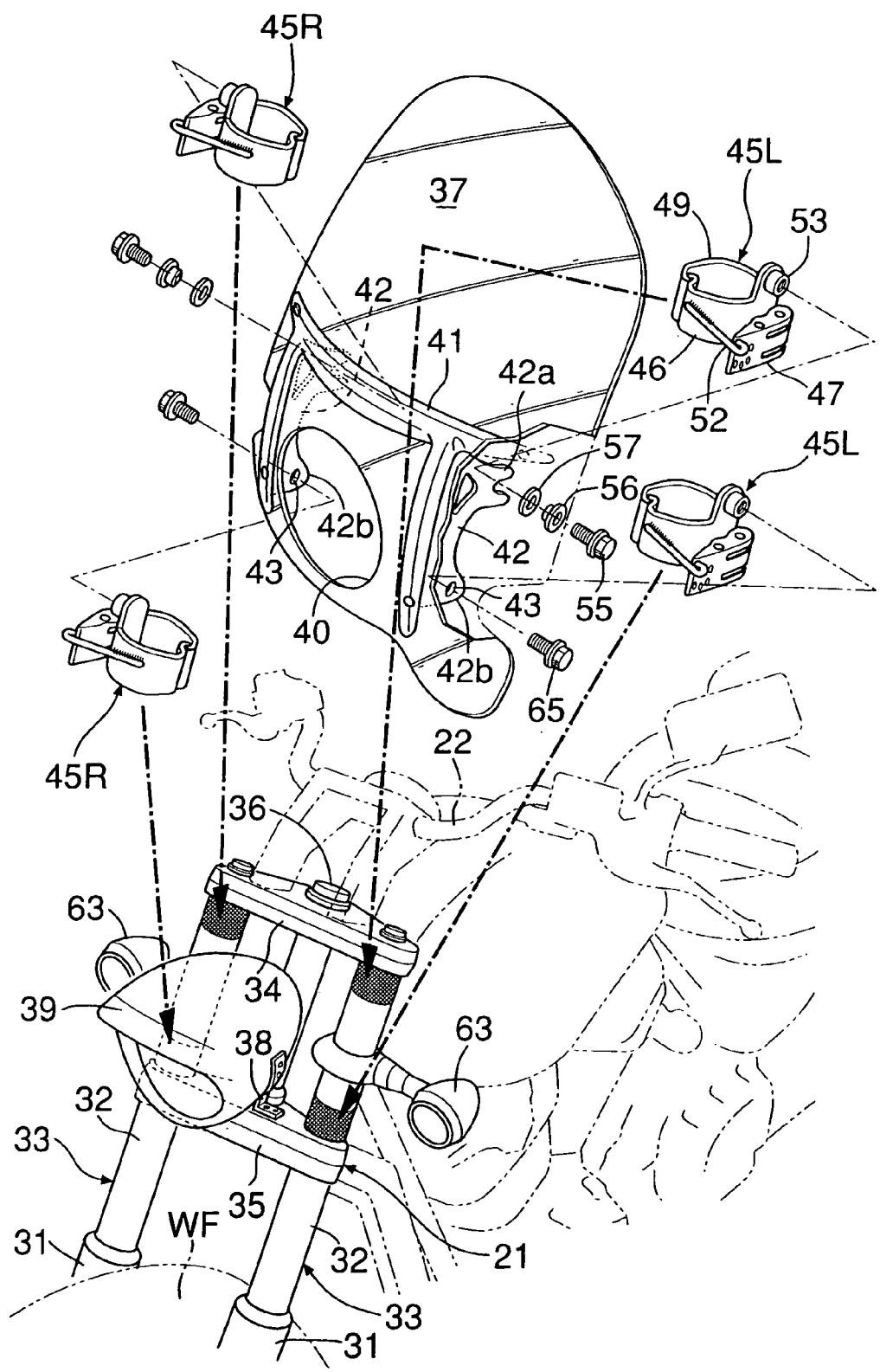
Figure 5:
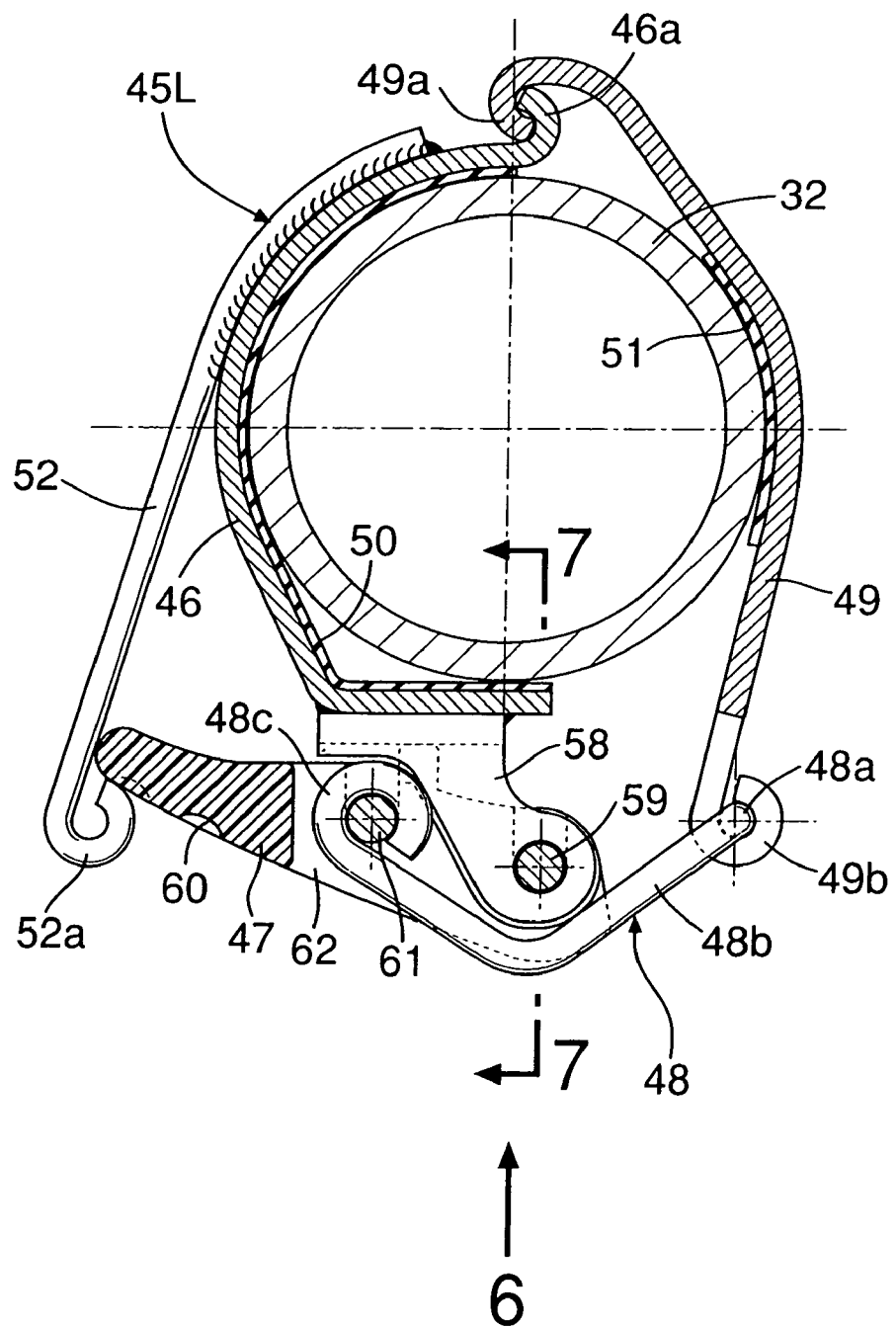
Figure 6:
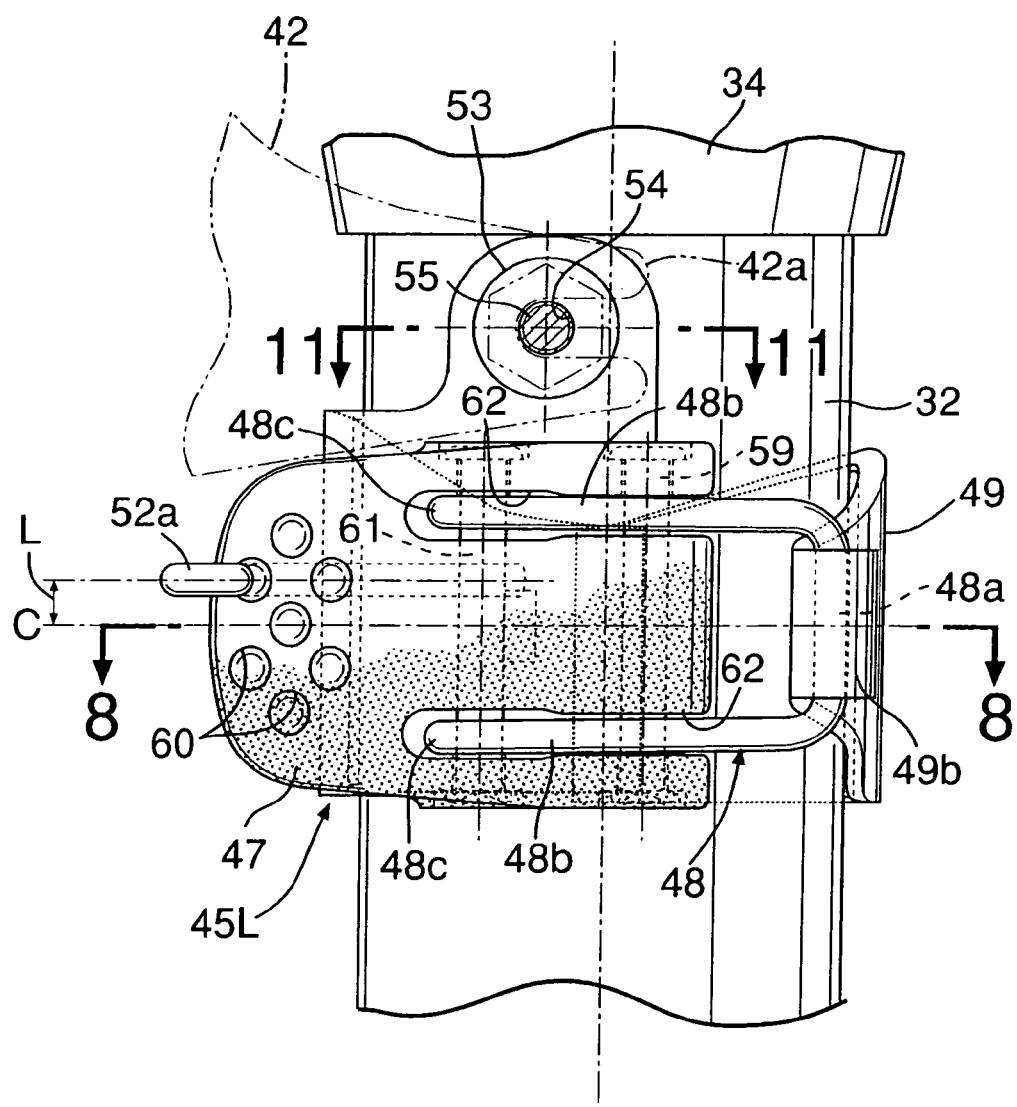
Figure 7:
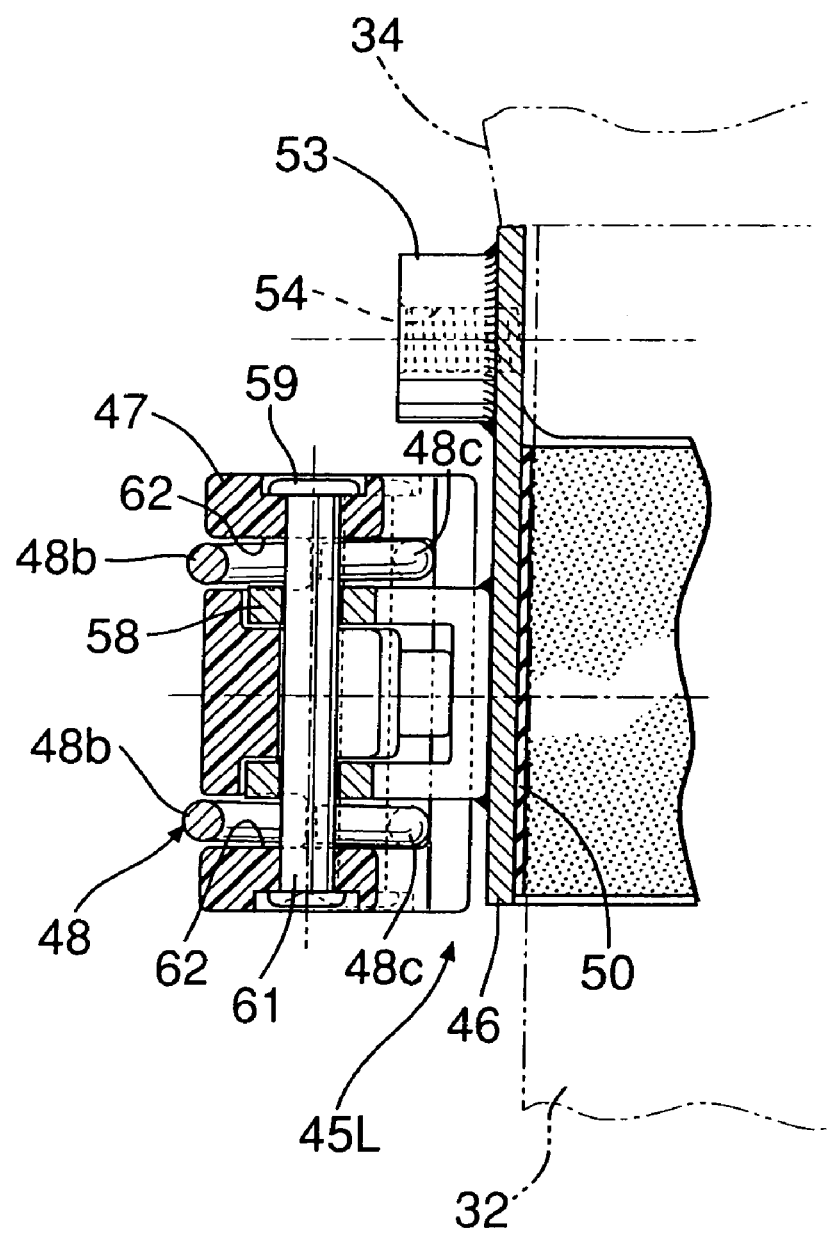
Figure 8:
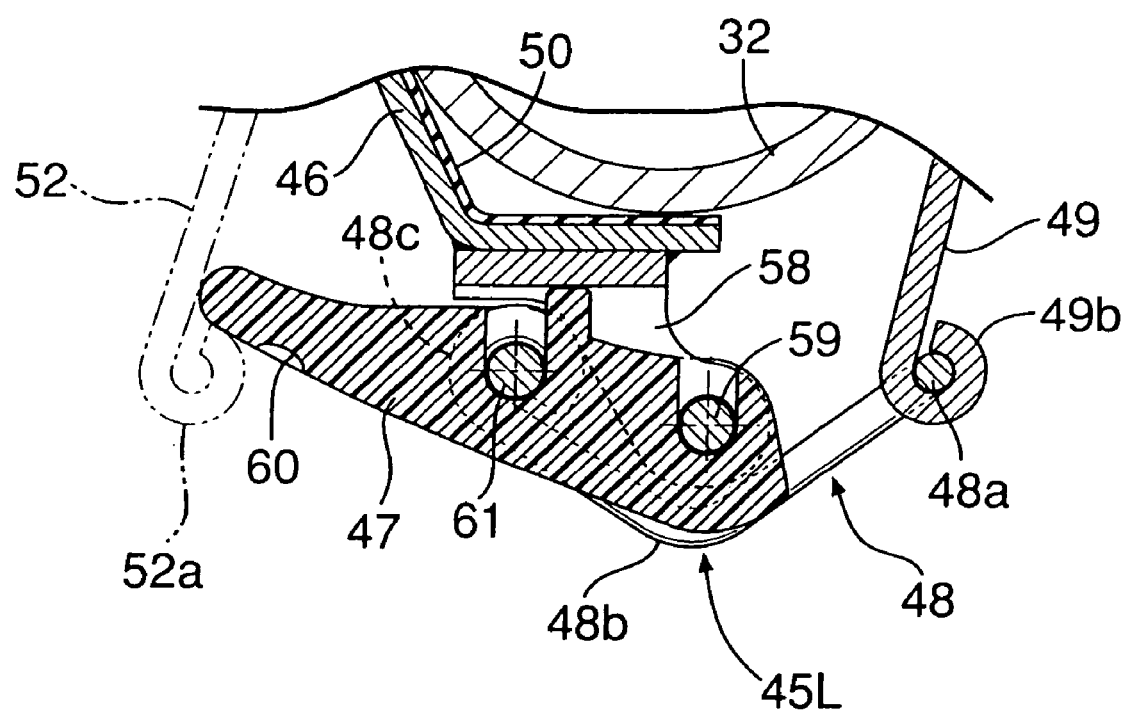

Referring also to FIG. 4, a windscreen 37 as a front part is disposed in front of the steering handlebar 22. The windscreen 37 is provided at its central lower portion with an opening 40 faced by a head lamp 39 supported by a bracket 38 mounted on the bottom bridge 35 of the front fork 21. A garnish 41 is disposed on opposite sides of and above the opening 40 on a front surface of the windscreen 37, and a pair of left and right mounting plates 42, 42 are disposed on a back of the windscreen 37, so that the windscreen 37 is sandwiched between the mounting plates 42, 42 and the garnish 41; and the garnish 41, the windscreen 37 and the mounting plates 42, 42 are clamped commonly.

Each of the mounting plates 42 is provided with an upper mounting portion 42a, and a lower mounting portion 42b disposed below the upper mounting portion 42a. The upper mounting portion 42a is formed into a substantially U-shape opened rearwards, and a mounting bore 43 is provided in the lower mounting portion 42b.

A pair of upper and lower part-mounting fixtures 45L, 45L are detachably mounted on the upper case 32 of one 33 of the pair of fork legs 33, 33 included in the front fork 21, which is disposed on a left side in a state facing in a direction of traveling of the two-wheeled motor vehicle, in such a manner that one of the part-mounting fixtures 45L abuts against the top bridge 34 from below, and the other part-mounting fixture 45L abuts against the bottom bridge 35 from above. A pair of upper and lower part-mounting fixtures 45R, 45R are detachably mounted on the upper case 32 of the fork leg 33 disposed on a right side in a state facing in the direction of traveling of the two-wheeled motor vehicle in such a manner that one of the part-mounting fixtures 45R abuts against the top bridge 34 from below, and the other part-mounting fixture 45R abuts against the bottom bridge 35 from above.

The upper mounting portions 42a, 42a mounted on the windscreen 37 are supported on upper ones 45L, 45R of the part-mounting fixtures 45L, 45L; 45R, 45R forming the pair vertically, and each of the lower mounting portions 42b, 42b mounted on the windscreen 37 is supported on each of the lower part-mounting fixtures 45L and 45R.

Referring to FIGS. 5 to 8, the part-mounting fixture 45L detachably mounted on the upper case 32 of the fork leg 33 disposed on the left side in the state facing in the direction of traveling of the two-wheeled motor vehicle in such a manner that it abuts against the top bridge 34 from below, includes a first embracing member 46 which is formed into such a shape that it abuts against a portion of an outer periphery of the upper case 32 and has an engaged portion 46a provided at one end in a circumferential direction of the upper case 32, an operating lever 47 connected at its base end to the other end of the first embracing member 46 for turning movement about an axis parallel to an axis of the upper case 32, an intermediate lever 48 connected at one end to an intermediate portion of the operating lever 47 for turning movement about an axis parallel to the turning axis for the operating lever 47, and a second embracing member 49 which is connected at one end to the other end of the intermediate lever 48 for turning movement about an axis parallel to the turning axis for the operating lever 47 and is provided at the other end with an engaging portion 49a disengageably engaging with the engaged portion 46a of the first embracing member 46.

The engaged portion 46a is provided at one end of the first embracing member 46 with a shape which is a substantially J-shape as viewed in a plane perpendicular to the axis of the upper case 32, and the engaging portion 49a is provided at the other end of the second embracing member 49 with a shape which is a substantially J-shape as viewed in a plane perpendicular to the axis of the upper case 32, so that it is disengageably brought into engagement with the engaged portion 46a and the second embracing member 49 can be turned about a point of engagement with the engaged portion 46a.

The first and second embracing members 46 and 49 are capable of embracing the upper case 32 by cooperation with each other, and a rubber 50 is adhered to an inner surface of the first embracing member 46. A rubber 51 is adhered to an inner surface of the second embracing member 49 at a location capable of contacting with an outer surface of the upper case 32. The rubbers 50 and 51 function to prevent the outer surface of the upper case 32 from being scratched due to the direct contact of the first and second embracing members 46 and 49 with the outer surface of the upper case 32.

A lever-retaining member 52 comprising a wire is secured at one end to an outer periphery of the first embracing member 46 by welding, and an engaging portion 52a is integrally formed at the other end of the lever-retaining member 52 by bending the wire into an arcuate shape.

The lever-retaining member 52 functions to retain the turned position of the operating lever 47 by bringing the engaging portion 52a into resilient engagement with the operating lever 47 when the operating lever 47 has been turned to a position in which the upper case 32 is embraced by cooperation of the first embracing member 46 and the second embracing member 49 with its engaging portion 49a engaging with the engaged portion 46a of the first embracing member 46. The lever-retaining member 52 is secured to the first embracing member 46 in such a manner that it is resiliently engaged with the operating lever 47 at a location displaced by a distance L in one of upward and downward directions, e.g., in the upward direction from a central position C of the operating lever 47 in a direction along the axis of the upper case 32, as clearly shown in FIG. 6.

A cylindrical mounting boss 53 is fixedly mounted at an upper portion of the other end of the first embracing member 46, and a threaded bore 54 is provided in the mounting boss 53.

A bracket 58 is mounted below the mounting boss 53 at the other end of the first embracing member 46, and the operating lever 47 made of a hard synthetic resin is turnably supported at its base end on the bracket 58 through a support pin 59 having an axis parallel to the axis of the upper case 32.

A plurality of depressions 60, 60 are provided in a surface of the operating lever 47 at its tip end for preventing the slipping of a finger manipulating of the operating lever 47. When the engaging portion 52a of the lever-retaining member 52 is brought into engagement with the tip end of the operating lever 47, the engaging portion 52a may be brought into one of the depressions 60, 60.

The intermediate lever 48 is formed into a substantially U-shape as viewed sideways of the upper case 32, for example, by bending a wire, in such a manner that it is integrally provided with a longitudinal rod 48a extending in parallel to the axis of the upper case 32 and turnably connected to one end of the second embracing member 49, a pair of transverse rods 48b, 48b connected perpendicularly at one ends to opposite ends of the longitudinal rod 48a, and connecting portions 48c, 48c provided at the other ends of the transverse rods 48b, 48b, respectively, and turnably connected to an intermediate portion of the operating lever 47.

A connecting tube 49b is integrally provided at one end of the second embracing member 49 by a bending process to surround the longitudinal rod 48a of the intermediate lever 48 in order to connect the longitudinal rod 48a for turning movement. The transverse rod 48b is bent in a chevron shape protruding outwards, as viewed in the same direction as the axis of the upper case 32, and the connecting portion 48c is formed by bending the other end of the transverse rod 48b into a substantially C-shape. The connecting portions 48c, 48c of the intermediate lever 48 are connected to the intermediate portion of the operating lever 47 through a connecting pin 61 parallel to the support pin 59.

A pair of accommodation grooves 62, 62 are provided in the operating lever 47 and accommodate at least portions of the transverse rods 48b, 48b of the intermediate lever 48 which are on the side of the operating lever 47, when the operating lever 47 has been turned to the position in which the engaging portion 52a of the lever-retaining member 52 is in engagement with the operating lever 47.

Moreover, the transverse rods 48b, 48b and the accommodation grooves 62, 62 are formed so that portions of the transverse rods 48b, 48b corresponding to the accommodation grooves 62, 62 are brought into frictional contact with sides of the accommodation grooves 62, 62.

To mount such part-mounting fixture 45L to the upper case 32, the engagement portion 49a of the second embracing member 49 is brought into engagement with the engaged portion 46a of the first embracing member 46 in a state in which the first embracing member 46, the operating lever 47, the intermediate lever 48 and the second embracing member 49 have been disposed to surround the upper case 32; and the operating lever 47 is turned toward the first embracing member 46. This causes the second embracing member 49 to be turned about the point of engagement of the engaging portion 49a with the engaged portion 46a in such a manner that one end of the second embracing member 49 is close to the first embracing member 46, whereby the upper case 32 is embraced by the first and second embracing members 46 and 49. This embraced state is maintained by resiliently bringing the engaging portion 52a of the lever-retaining member 52 into engagement with the operating lever 47.

Figure 9:
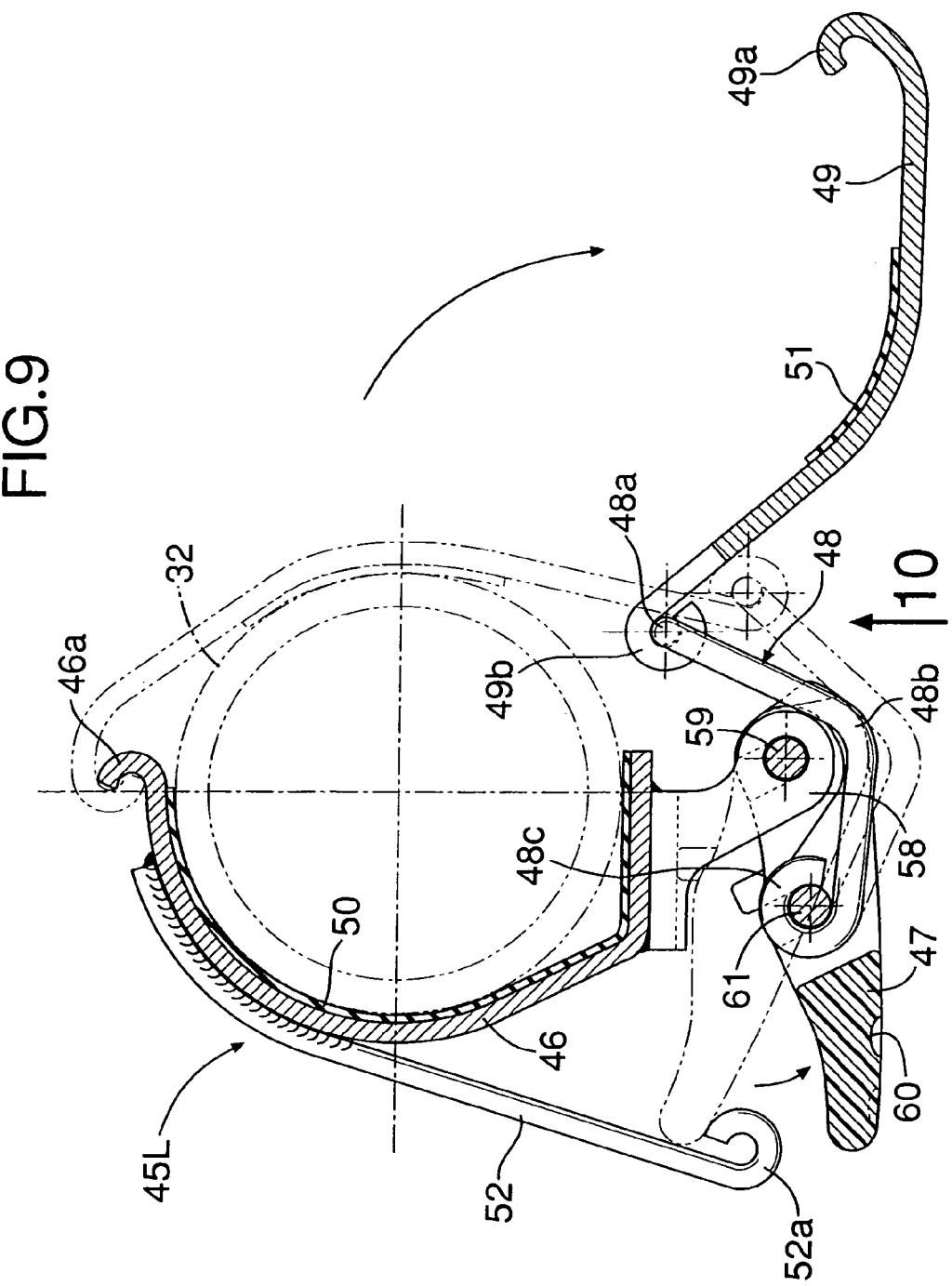
Figure 10:
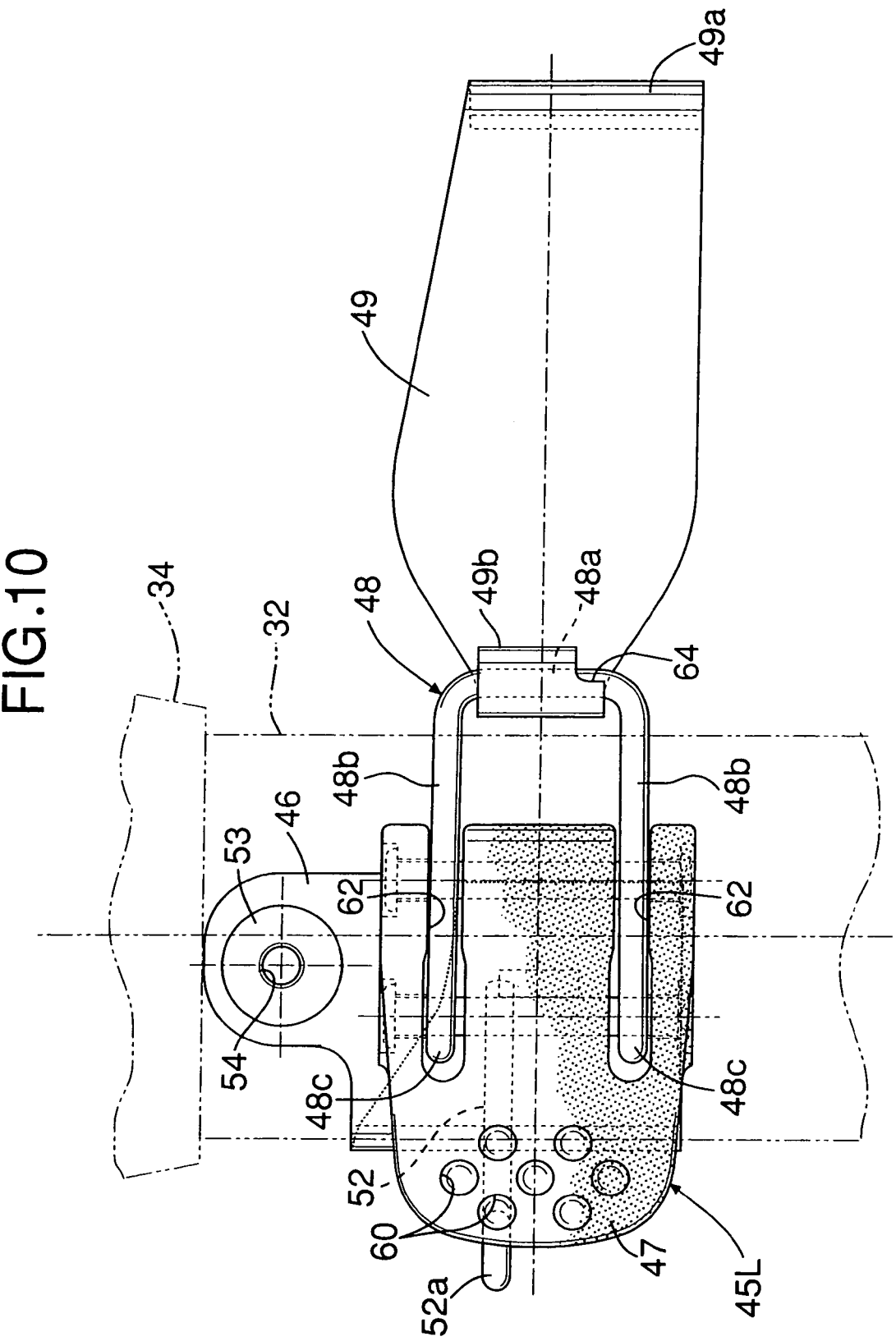

To demount the part-mounting fixture 45L from the upper case 32, the operating lever 47 may be turned in a direction in which the resiliently engaged state of the lever-retaining member 52 is released, as shown in FIGS. 9 and 10. This causes the embraced state of the upper case 32 provided by the first and second embracing members 46 and 49 to be loosened, and the part-mounting fixture 45L can be demounted from the upper case 32 by releasing the engaged state of the engagement portion 49a with the engaged portion 46a. Thus, the mounting and demounting of the part-mounting fixture 45L to and from the upper case 32 can be carried out easily by turning the operating lever 47.

It should be noted here that the connecting tube 49b is provided at one end of the second embracing member 49 to surround the longitudinal rod 48a of the intermediate lever 48, and a notch 64 is provided in axially one end of the connecting tube 49b (in a lower end in the present embodiment), so that one of the transverse rods 48b, 48b e.g., the lower transverse rod 48b is fitted into the notch 64, as the second embracing member 49, disengaged from the engaged portion 46a at one end of the first embracing member 46 and turned to a predetermined position about an axis of the longitudinal rod 48a, is slid by a predetermined amount along the longitudinal rod 48a, whereby the lower transverse rod 48b is received within the notch 64, and rotation of the second embracing member 49 is limited.

The upper mounting portion 42a on the side of the windscreen 37 is mounted to the mounting boss 53 of the part-mounting fixture 45L which is mounted to the upper case 32 of the fork leg 33 disposed on the left side in a state facing in the direction of traveling of the two-wheeled motor vehicle in such a manner that it abuts against the top bridge 34 from below.

Figure 11:
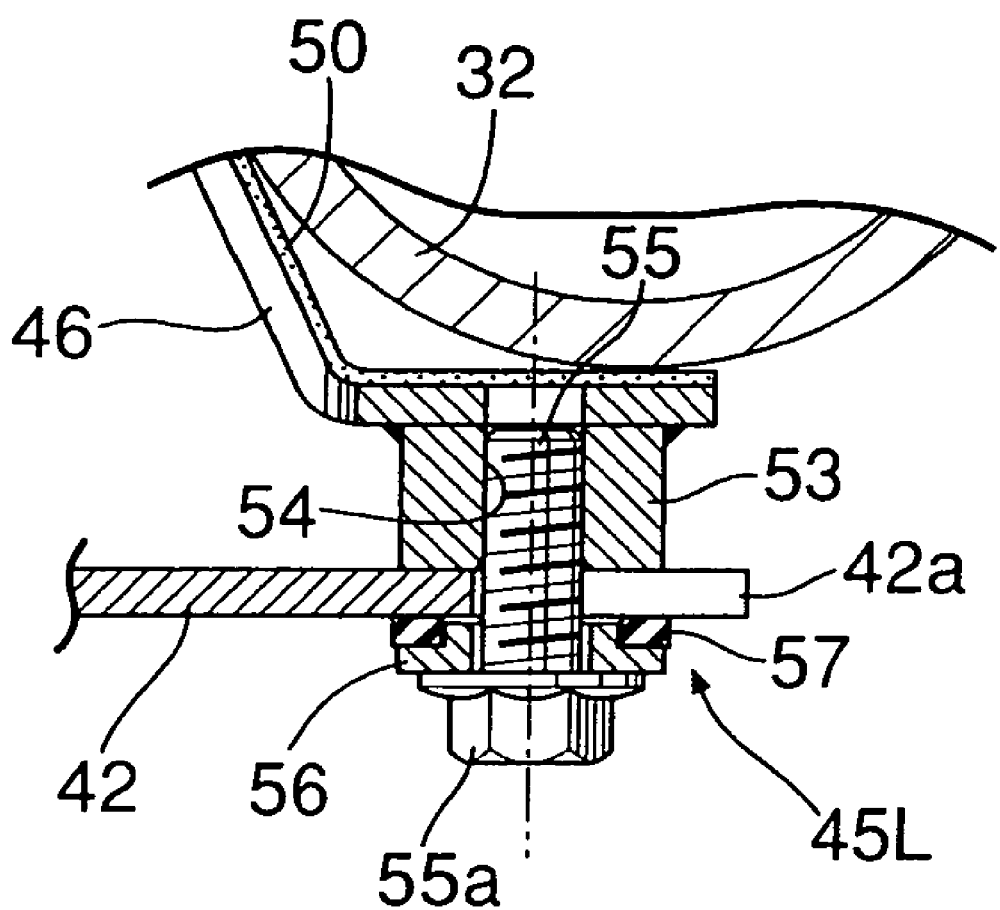

Referring to FIG. 11, the upper mounting portion 42a abuts against an outer end of the mounting boss 53. A bolt 55 threadedly engaged in the threaded bore 54 in the mounting boss 53 is inserted through the upper mounting portion 42a having the substantially U-shape opened rearwards, and a washer 56 and a ring-shaped elastic member 57 are interposed between an enlarged head 55a of the bolt 55 and an outer surface of the upper mounting portion 42a. Thus, the upper mounting portion 42a is claimed between the mounting boss 53 and the enlarged head 55a of the bolt 55 by tightening the bolt 55, but when a shocking load is applied to the windscreen 37 from behind, the upper mounting portion 42a is movable forwards with the bolt 55 left behind.

On the other hand, the lower mounting portion 42b on the side of the windscreen 37 is mounted to the mounting boss 53 of the part-mounting fixture 45L which is mounted to the upper case 32 of the fork leg 33 disposed on the left side in such a manner that it abuts against the bottom bridge 35 from above.

Figure 12:
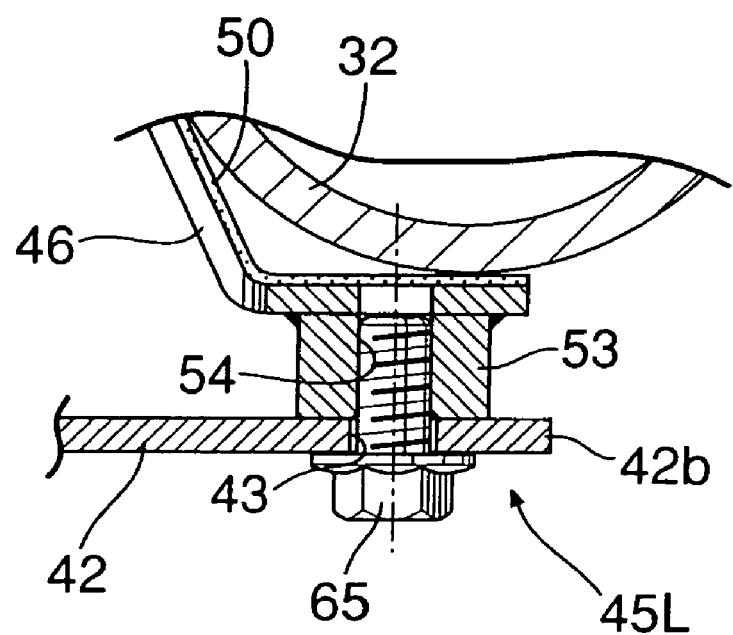

Referring to FIG. 12, the lower mounting portion 42b having the mounting bore 43 abuts against the outer end of the mounting boss 53, and the lower mounting portion 42b is fastened to the mounting boss 53 by threadedly fitting the bolt 65 inserted through the mounting bore 43 into the threaded bore 54 in the mounting boss 53 to tighten the bolt 65.

The part-mounting fixtures 45R, 45R mounted to the upper case 32 of the fork leg 33 disposed on the right side in the state facing in the direction of traveling of the two-wheeled motor vehicle so as to abut against the top bridge 34 and the bottom bridge 35 are formed symmetrically with the part-mounting fixtures 45L, 45L with respect to a vertical plane including the centerline extending longitudinally of the two-wheeled motor vehicle, and the detailed description of the structure of the part-mounting fixtures 45R, 45R is omitted.

Winkers 63, 63 are supported between the pairs of upper and lower part-mounting fixtures 45L, 45L; 45R, 45R on the upper cases 32, 32 between the top bridge 34 and the bottom bridge 35 and disposed in recesses 37a, 37a provided in opposite sides of the windscreen 37.

The operation of the first embodiment will be described below. The windscreen 37 disposed in front of the steering handlebar 22 is supported on the part-mounting fixtures 45L, 45L, 45R, 45R, which are detachably mounted to the upper cases 32, 32 of the pair of fork legs 33, 33 included in the front fork 21. Therefore, the windscreen 37 can be mounted easily to the front fork 21, while increasing the degree of freedom of the disposition limited on the steering handlebar 22.

In addition, the windscreen 37 is provided with the upper mounting portion 42a and the lower mounting portion 42b disposed below the upper mounting portion 42a. Each of the two sets of the pairs of upper and lower part-mounting fixtures 45L, 45L; 45R, 45R, which is formed switchably between the state in which they embrace the upper case 32 and the state in which the embraced state is released, and which supports the upper mounting portion 42a and the lower mounting portion 42b individually, are mounted to the upper cases 32 in such a manner that one of the part-mounting fixtures 45L, 45R abuts against the top bridge 34 from below and the other part-mounting fixture 45L, 45R abuts against the bottom bridge 35 from above. Therefore, the windscreen 37 can be mounted easily to the upper cases 32, while being positioned.

Thus, when the pair of upper and lower part-mounting fixtures 45L, 45L; 45R, 45R connected to each other through the windscreen 37 are mounted to the upper case 32 to embrace the upper case 32 from the periphery of the latter, each of the part-mounting fixtures 45L, 45L; 45R, 45R is inhibited from being moved vertically along the upper case 32, and the windscreen 37 can be mounted easily to the upper case 32 with its vertical position maintained constant.

Moreover, each of the part-mounting fixtures 45L, 45R includes the first embracing member 46 which is formed into the shape that it abuts against a portion of the outer periphery of the upper case 32 and is provided at one end in the circumferential direction of the upper case 32 with the engaged portion 46a, the operating lever 47 connected at its base end to the other end of the first embracing member 46 for turning movement about the axis parallel to the axis of the upper case 32, the intermediate lever 48 connected at one end to the intermediate portion of the operating lever 47 for turning movement about the axis parallel to the turning axis for the operating lever 47, and the second embracing member 49 which is connected at one end to the other end of the intermediate lever 48 for turning movement about the axis parallel to the turning axis for the operating lever 47 and is provided at the other end with the engagement portion 49a disengageably engaged with the engaged portion 46a of the first embracing member 46. The first embracing member 46 is provided with the lever-retaining member 52 which is resiliently engaged with the operating lever 47 in the state in which it has embraced the upper case 32, thereby maintaining the turned position of the operating lever 47, and the mounting boss 53 for mounting the windscreen 37.

With such part-mounting fixtures 45L, 45R, the mounting and demounting thereof to and from the upper case 32 can be carried out easily by the turning of the operating lever 47.

The intermediate lever 48 is formed into the substantially U-shape in such a manner that it is integrally provided with the longitudinal rod 48a turnably connected to one end of the second embracing member 49, the pair of transverse rods 48b, 48b connected perpendicularly at one ends to the opposite ends of the longitudinal rod 48a, and the connecting portions 48c, 48c provided at the other ends of the transverse rods 48b, 48b, respectively, and turnably connected to the intermediate portion of the operating lever 47. The operating lever 47 is provided with the pair of accommodation grooves 62, 62 for accommodating at least the portions of the transverse rods 48b, 48b on the side of the operating lever 47 when the operating lever 47 has been turned in the direction of engagement with the lever-retaining member 52.

Therefore, in the state in which the part-mounting fixture 45L, 45R has been mounted to the upper case 32, a portion of the intermediate lever 48 is accommodated within the operating lever 47 and thus, it can be ensured that the part-mounting fixture 45L, 45R mounted to the upper case 32 is compact.

The connecting tube 49b is mounted at one end of the second embracing member 49 to surround the longitudinal rod 48a of the intermediate lever 48 in order to connect the longitudinal rod 48a for turning movement. As the second embracing member 49 disengaged from the one end of the first embracing member 46 and turned to the predetermined position about the axis of the longitudinal rod 48a is slid by the predetermined amount along the longitudinal rod 48a, one of the transverse rods 48b, 48b is fitted into the notch 64 provided in the axially one end of the connecting tube 49b. Therefore, in the state in which the part-mounting fixture 45L, 45R has been demounted from the upper case 32, the relative attitudes of the intermediate lever 48 and the second embracing member 49 can be maintained constant. When the part-mounting fixture 45L, 45R is mounted to the upper case 32, the mounting operation cannot be impeded due to the drifting of the second embracing member 49 and hence, the smooth mounting operation can be conducted.

Further, since the portions of the transverse rods 48b, 48b of the intermediate lever 48 corresponding to the accommodation grooves 62, 62 are in frictional contact with the side faces of the accommodation grooves 62, 62, a frictional force opposing an operating force during turning of the operating lever 47 is generated between the transverse rods 48b, 48b of the intermediate lever 48 and the operating lever 47 and hence, a good operational feeling can be provided during turning of the operating lever 47.

Moreover, the lever-retaining member 52 is resiliently engaged with the operating lever 47 in the position displaced in one of the upward and downward directions from the central position of the operating lever 47 in the direction along the axis of the upper case 32. Therefore, even if the width of the operating lever 47 in the direction along the axis of the upper case 32 is not increased, a space sufficient for putting a finger on the operating lever 47 for the turning operation of the latter can be ensured, thereby further contributing to the compactness of the part-mounting fixtures 45L and 45R.

Figure 13:
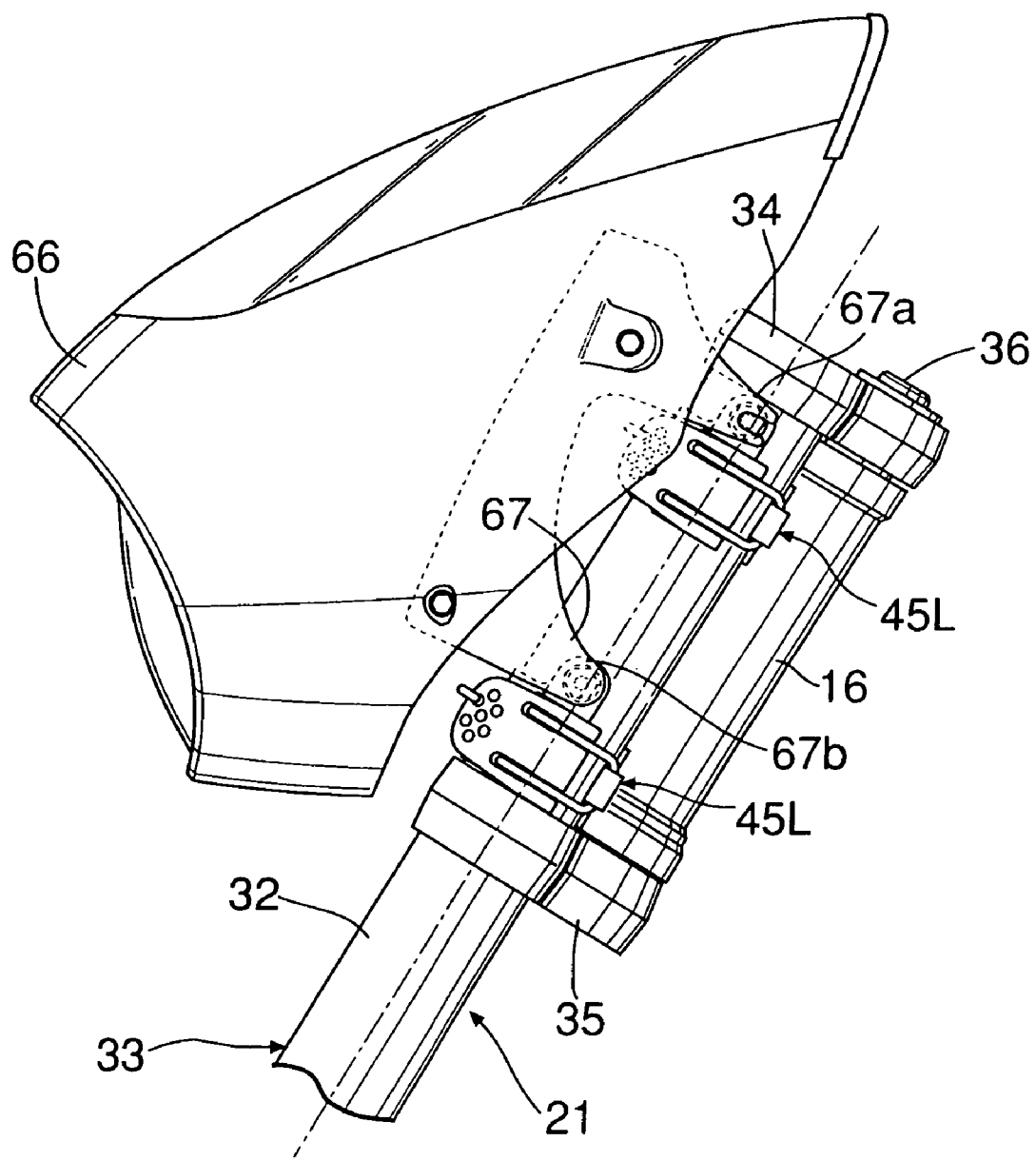
FIG. 13 is a side view similar to FIG. 3, but according to a second embodiment of the present invention.

FIG. 13 shows a second embodiment of the present invention. A mini-cowl 66 as a front part is disposed in front of the steering handlebar 22, and pairs of upper mounting portions 67a and lower mounting portions 67b are disposed in laterally two sets on a mounting plate 67 mounted on a back of the mini-cowl 66. As in the first embodiment, part-mounting fixtures 45L, 45L for supporting the upper mounting portions 67a and lower mounting portions 67b of the mini-cowl 66 are detachably mounted to upper cases 32, 32 of the pair of fork legs 33, 33 included in the front fork 21.

Even according to the second embodiment, an effect similar to that in the first embodiment can be provided.

Although the embodiments of the present invention have been described, it will be understood that the present invention is not limited to the above-described embodiments, and various modifications in design may be made without departing from the scope of the invention defined in claims.

For example, the present invention can be carried out in association with a luggage-accommodating cage in addition to the windscreen 37 and the mini-cowl 66 described in the above-described embodiments, and is applicable widely to a structure of mounting of a front part disposed in front of a steering handlebar.

What is claimed is:

1. A structure of mounting of a front part in a two-wheeled motor vehicle comprising a front fork including a pair of fork legs each of which is formed telescopically to have a cylindrical lower case for pivotally supporting a front wheel at a lower end thereof and a cylindrical upper case fitted into said lower case, said fork legs being disposed on opposite sides of the front wheel, a top bridge for connecting upper portions of said pair of upper cases to each other, and a bottom bridge for connecting said upper cases to each other below said top bridge, said front fork being steerably supported by a head pipe at a front end of a vehicle body frame assembly; and a steering handlebar connected to an upper end of said front fork, characterized in that part-mounting fixtures for supporting the front part disposed in front of said steering handlebar are detachably mounted to the upper cases of said front fork, wherein each of said part-mounting fixtures comprises a first embracing member having an engaged portion provided at one of opposite ends thereof, and a second embracing member which is provided at one of opposite ends thereof with an engaging portion that disengageably engages with said engaged portion of the first embracing member for surrounding and clamping each of said upper cases, said second embracing member being operatively connected at the other end thereof with the other end of said first embracing member such that said second embracing member is rotatable relative to said first embracing member around a rotating axis parallel to an axis of said upper case when said engaging portion of the second embracing member is disengaged from said engaged portion of the first embracing member, wherein said first embracing member is formed into such a shape that said first embracing member abuts against a portion of an outer periphery of the upper case and said part-mounting fixture further comprises an operating lever connected at a base end thereof to the other end of the first embracing member for turning movement about an axis parallel to said rotating axis, an intermediate lever connected at one end to an intermediate portion of the operating lever for turning movement about an axis parallel to the turning axis for the operating lever, and said other end of the second embracing member is connected to the other end of said intermediate lever for turning movement about said rotating axis, and said first embracing member is provided with a lever-retaining member which is resiliently engaged with said operating lever to retain the turned position of said operating lever, when said operating lever has been turned to a position in which the second embracing member having the engaging portion engaging with the engaged portion embraces the upper case by cooperation with the first embracing member, and a mounting boss for mounting said front part.

2. A structure of mounting of a front part in a two-wheeled motor vehicle comprising a front fork including a pair of fork legs each of which is formed telescopically to have a cylindrical lower case for pivotally supporting a front wheel at a lower end thereof and a cylindrical upper case fitted into said lower case, said fork legs being disposed on opposite sides of the front wheel, a top bridge for connecting upper portions of said pair of upper cases to each other, and a bottom bridge for connecting said upper cases to each other below said top bridge, said front fork being steerably supported by a head pipe at a front end of a vehicle body frame assembly; and a steering handlebar connected to an upper end of said front fork, characterized in that part-mounting fixtures for supporting the front part disposed in front of said steering handlebar are detachably mounted to the upper cases of said front fork, wherein each of said part-mounting fixtures comprises a first embracing member having an engaged portion provided at one of opposite ends thereof, and a second embracing member which is provided at one of opposite ends thereof with an engaging portion that disengageably engages with said engaged portion of the first embracing member for surrounding and clamping each of said upper cases, said second embracing member being operatively connected at the other end thereof with the other end of said first embracing member such that said second embracing member is rotatable relative to said first embracing member around a rotating axis parallel to an axis of said upper case when said engaging portion of the second embracing member is disengaged from said engaged portion of the first embracing member, wherein the front part is provided with an upper mounting portion and a lower mounting portion disposed below the upper mounting portion, and wherein said part mounting fixtures comprise a pair of upper part mounting fixtures and a pair of lower part mounting fixtures, the pair of upper and lower part-mounting fixtures are formed switchably between a state in which said part-mounting fixtures embrace the upper case, and a state in which the embraced state is released, and support the upper mounting portion and the lower mounting portion individually, said part-mounting fixtures being mounted to said upper case in such a manner that one pair of said part-mounting fixtures abuts against said top bridge from below and the other pair of part-mounting fixture abuts against said bottom bridge from above.

3. A structure of mounting of a front part in a two-wheeled motor vehicle according to claim 2, wherein said first embracing member is formed into such a shape that said first embracing member abuts against a portion of an outer periphery of the upper case and said part-mounting fixture further comprises an operating lever connected at a base end thereof to the other end of the first embracing member for turning movement about an axis parallel to said rotating axis, an intermediate lever connected at one end to an intermediate portion of the operating lever for turning movement about an axis parallel to the turning axis for the operating lever, and said other end of the second embracing member is connected to the other end of said intermediate lever for turning movement about said rotating axis, and said first embracing member is provided with a lever-retaining member which is resiliently engaged with said operating lever to retain the turned position of said operating lever, when said operating lever has been turned to a position in which the second embracing member having the engaging portion engaging with the engaged portion embraces the upper case by cooperation with the first embracing member, and a mounting boss for mounting said front part.

4. A structure of mounting of a front part in a two-wheeled motor vehicle according to claim 1 or 3, wherein said intermediate lever is integrally provided with a longitudinal rod extending in parallel to the axis of the upper case and turnably connected to said other end of the second embracing member, a pair of transverse rods connected perpendicularly at one ends to opposite ends of said longitudinal rod, and connecting portions provided at the other ends of the transverse rods respectively and turnably connected to an intermediate portion of said operating lever, and said operating lever is provided with a pair of accommodation grooves in which at least portions of the transverse rods on the side of the operating lever are accommodated upon turning of said operating lever in a direction of engagement with said lever-retaining member.

5. A structure of mounting of a front part in a two-wheeled motor vehicle according to claim 4, wherein the second embracing member is provided at said other end with a connecting tube which surrounds said longitudinal rod to connect said longitudinal rod for turning movement, and said connecting tube has a notch provided in an axially one end thereof, so that one of said transverse rods is fitted into said notch, as said second embracing member disengaged from said one end of the first embracing member and turned about said rotating axis to a predetermined position is slid by a predetermined amount along the longitudinal rod.

6. A structure of mounting of a front part in a two-wheeled motor vehicle according to claim 4, wherein said transverse rods and said accommodation grooves are formed so that a portion of each of said transverse rods corresponding to each of said accommodation grooves is in frictional contact with a side face of each of said accommodation grooves.

7. A structure of mounting of a front part in a two-wheeled motor vehicle according to claim 1 or 3, wherein said lever-retaining member is mounted on the first embracing member so as to be resiliently engaged with the operating lever in a position displaced in one of upward and downward directions from the central position of said operating lever in a direction along the axis of said upper case.

8. A structure of mounting of a front part in a two-wheeled motor vehicle according to claim 4, wherein said lever-retaining member is mounted on the first embracing member so as to be resiliently engaged with the operating lever in a position displaced in one of upward and downward directions from the central position of said operating lever in a direction along the axis of said upper case.

9. A structure of mounting of a front part in a two-wheeled motor vehicle according to claim 5, wherein said lever-retaining member is mounted on the first embracing member so as to be resiliently engaged with the operating lever in a position displaced in one of upward and downward directions from the central position of said operating lever in a direction along the axis of said upper case.

10. A structure of mounting of a front part in a two-wheeled motor vehicle according to claim 6, wherein said lever-retaining member is mounted on the first embracing member so as to be resiliently engaged with the operating lever in a position displaced in one of upward and downward directions from the central position of said operating lever in a direction along the axis of said upper case.

11. A structure of mounting of a front part in a two-wheeled motor vehicle according to claim 5, wherein said transverse rods and said accommodation grooves are formed so that a portion of each of said transverse rods corresponding to each of said accommodation grooves is in frictional contact with a side face of each of said accommodation grooves.

12. A structure of mounting of a front part in a two-wheeled motor vehicle according to claim 11, wherein said lever-retaining member is mounted on the first embracing member so as to be resiliently engaged with the operating lever in a position displaced in one of upward and downward directions from the central position of said operating lever in a direction along the axis of said upper case.

13. A structure of mounting of a front part in a two-wheeled motor vehicle according to claim 1 wherein said front part comprises a wind deflecting member of said two-wheeled motor vehicle.

14. A structure of mounting of a front part in a two-wheeled motor vehicle according to claim 1 wherein said front part comprises at least one of a windscreen and a cowl member of said two-wheeled motor vehicle.

15. A structure of mounting of a front part in a two-wheeled motor vehicle according to claim 1 wherein one of said first and second embracing members further comprises a notch for restricting a free rotational movement of said second embracing member relative to said first embracing member around said rotating axis when the engaging portion of the second embracing member is disengaged from the engaged portion of the first embracing member.

* * * * *